(12) United States Patent
Di et al.

(10) Patent No.: US 9,845,672 B2
(45) Date of Patent: Dec. 19, 2017

(54) IN-SITU ULTRASONIC MEASURING SYSTEM FOR NATURAL GAS FLUX AT THE HYDROCARBON SEEPS AT THE SEAFLOOR

(71) Applicants: SOUTH CHINA SEA INSTITUTE OF OCEANOLOGY, CHINESE ACADEMY OF SCIENCES, Guangzhou, Guangdong (CN); GUANGDONG UNIVERSITY OF TECHNOLOGY, Guangzhou, Guangdong (CN)

(72) Inventors: Pengfei Di, Guangzhou (CN); Jianjun Long, Guangzhou (CN); Daxin Long, Guangzhou (CN); Linying Chen, Guangzhou (CN); Dong Feng, Guangzhou (CN); Duofu Chen, Guangzhou (CN)

(73) Assignees: SOUTH CHINA SEA INSTITUTE OF OCEANOLOGY, CHINESE ACADEMY OF SCIENCES, Guangdong (CN); GUANGDONG UNIVERSITY OF TECHNOLOGY, Guangdong (CN)

(*) Notice: Subject to any disclaimer, the term of this patent is extended or adjusted under 35 U.S.C. 154(b) by 0 days.

(21) Appl. No.: 14/772,308

(22) PCT Filed: Feb. 5, 2015

(86) PCT No.: PCT/CN2015/072319
§ 371 (c)(1),
(2) Date: Sep. 2, 2015

(87) PCT Pub. No.: WO2015/117562
PCT Pub. Date: Aug. 13, 2015

(65) Prior Publication Data
US 2016/0333687 A1  Nov. 17, 2016

(30) Foreign Application Priority Data

Feb. 7, 2014 (CN) .......................... 2014 1 0045178

(51) Int. Cl.
*E21B 47/001* (2012.01)
*E21B 47/10* (2012.01)
(Continued)

(52) U.S. Cl.
CPC ........ *E21B 47/101* (2013.01); *E21B 47/0001* (2013.01); *E21B 47/011* (2013.01);
(Continued)

(58) Field of Classification Search
CPC .. E21B 47/0001; E21B 47/011; E21B 47/101; E21B 43/0122; G01F 1/66; G01F 1/662; G01V 9/007
See application file for complete search history.

(56) References Cited

U.S. PATENT DOCUMENTS 4,273,212 A * 6/1981 Dorr .................... E21B 21/001
175/40
4,903,524 A * 2/1990 Kataoka ................. G01M 3/10
73/41.2
(Continued)

FOREIGN PATENT DOCUMENTS

CN    101072452 A    11/2007
CN    103454684 A    12/2013
(Continued)

OTHER PUBLICATIONS

Long et al., "In situ measurement of fluid flow and signatures of seep activity at marine seep sites", Progress in Geophysics, Oct. 2008, pp. 1592-1602, vol. 23, No. 5, ISR, w/ English abstract (12 pages).
(Continued)

*Primary Examiner* — Matthew R Buck
(74) *Attorney, Agent, or Firm* — Westerman, Hattori, Daniels & Adrian (57) ABSTRACT

An in-situ and on-line acoustic measuring system for natural gas flux at the hydrocarbon seeps at a seafloor includes a seepage tent and a flow measuring channel. The flow measuring channel includes a lower bubble breaking channel, an ultrasonic transducer measuring channel and an upper bubble breaking channel. The lower bubble breaking channel communicates with the seepage tent provided with bubble breaking grids. Lower and upper bubble breaking devices, arranged in a bubble rising direction, are respectively mounted in the lower and upper bubble breaking channels. One side of the ultrasonic transducer measuring channel is fixedly connected with an acoustic wave demultiplexer, and the other side is fixedly connected with flat receiving transducers receiving transmitting acoustic waves generated by an acoustic wave branching unit. Acoustic wave probes, also used for receiving the transmitting acoustic waves generated by the acoustic wave demultiplexer, are arranged in the ultrasonic transducer measuring channel.

11 Claims, 4 Drawing Sheets

(51) Int. Cl.
  *G01F 1/66* (2006.01)
  *E21B 47/00* (2012.01)
  *E21B 47/01* (2012.01)
  *G01V 9/00* (2006.01)

(52) U.S. Cl.
  CPC ............... *G01F 1/66* (2013.01); *G01F 1/662* (2013.01); *G01V 9/007* (2013.01)

(56) References Cited

U.S. PATENT DOCUMENTS

| | | | |
|---|---|---|---|
| 5,130,950 A * | 7/1992 | Orban ................... | B06B 1/0681 181/102 |
| 5,214,251 A * | 5/1993 | Orban ..................... | E21B 21/08 181/102 |
| 5,237,856 A * | 8/1993 | Peake ..................... | G01M 3/10 73/45.5 |
| 5,337,597 A * | 8/1994 | Peake ..................... | G01M 3/10 73/45.5 |
| 6,578,405 B2 * | 6/2003 | Kleinberg .............. | G01V 9/007 181/115 |
| 8,986,547 B2 * | 3/2015 | Baccigalopi ......... | B23K 31/027 166/359 |
| 9,004,175 B2 * | 4/2015 | Abel ..................... | E21B 33/064 166/338 |
| 9,109,430 B2 * | 8/2015 | Ibanez ................. | E21B 43/0122 |
| 2014/0283585 A1 * | 9/2014 | Sæther ..................... | G01M 3/06 73/61.43 |

FOREIGN PATENT DOCUMENTS

| | | |
|---|---|---|
| CN | 103776499 A | 5/2014 |
| EP | 0 080 640 A1 | 6/1983 |
| JP | 2011-122920 A | 6/2011 |

OTHER PUBLICATIONS

Di et al., "Method of measuring bubble flow from cool seeps on seafloor using acoustic transmission and preliminary experiments", Journal of Tropical Oceanography, Sep. 2012, pp. 100-105, vol. 31, No. 5, ISR, w/ English abstract (7 pages).
International Search Report dated May 11, 2015, issued in counterpart International Application No. PCT/CN2015/072319 (3 pages).

* cited by examiner

IN-SITU ULTRASONIC MEASURING SYSTEM FOR NATURAL GAS FLUX AT THE HYDROCARBON SEEPS AT THE SEAFLOOR

FIELD OF THE INVENTION

The present invention relates to an in-situ ultrasonic measuring system for natural gas flux at the hydrocarbon seepsat the seafloor, particularly measuring the flux of seafloor seeping bubbles by adopting an acoustic method.

BACKGROUND OF THE INVENTION

The in-situ ultrasonic measuring device for natural gas flux at the hydrocarbon seeps at the seafloor is a new technology of research and development at home and abroad in recent decades, and the research of this field is internationally thriving. The deep sea technology is regarded as a preferentially funded high-tech project of national sea field in the United States. In 1998, Professor Harry Roberts of Coastal Research Institute of Louisiana State University already designed and manufactured a natural gas flux measuring device, and successfully observed the natural gas seepage system at Bush Hill of Mexico Gulf. In 1999, Mexico Gulf Natural Gas Hydrate Research Union organized 15 colleges, 5 federal agencies and a few private companies, to research a real-time observation system for natural gas hydrate at the seafloor under the lead of the Mississippi University and carry out geochemical, microbial and seismic observation on Mississippi Canyon Block 118 of Mexico Gulf. Meanwhile, University of California, Santa Barbara observed global typical natural gas seepage and natural gas hydrate development zones of Hydrate Ridge, Mexico Gulf and the like by adopting the designed seafloor cold observation device. Hydrates developed in seepage systems (namely seepage type hydrates) have the characteristics of shallow burial, easiness in exploitation, high value and the like. The quantity of methane released to the sea water and the air through seepage of seafloor cold natural gas every year is very striking, and is more than 10 Tg ($10^{12}$ g) every year as preliminary estimated. Methane is a strong greenhouse gas with a greenhouse effect approximately twenty times greater than that of an equal quantity of carbon dioxide, and may have an important impact on global climate change. Thus, it has an important economic value and scientific significance for in-situ and on-line measuring of natural gas flux at hydrocarbon seeps at the seafloor. At present, the research on the on-line measuring device for in-situ seepage flow of seafloor cold natural gas has been developed at home, and Guangzhou Institute of Geochemistry, Chinese Academy of Sciences has successfully researched an in-situ and on-line measuring devices for natural gas flux at hydrocarbon seeps at the seafloor, to fill the blank of China in this field. However, with the devices researched successfully, it is difficult to carry out long-term and multi-environment in-situ and on-line observation on the natural gas flux at hydrocarbon seeps at the seafloor due to the limitations of materials, components, power consumption and the like as well as poor working performance and stability of the devices.

SUMMARY OF THE INVENTION

To overcome the shortcoming that the existing in-situ and on-line measuring device for seepage flow of seafloor cold natural gas can not carry out long-term and multi-environment in-situ and on-line observation, the present invention provides an in-situ ultrasonic measuring system for seepage flow of seafloor cold natural gas, which has the characteristics of small size, light mass, low power consumption and the like and can be used for long-term in-situ and on-line measuring natural gas flux at the hydrocarbon seeps at the seafloor under different water depths.

To achieve the object of the present invention, the present invention adopts the following technical solution:

An in-situ acoustic measuring system for natural gas flux at the hydrocarbon seeps at the seafloor, comprising a seep tent and a flow measuring channel, the flow measuring channel comprising a lower bubble breaking channel, an ultrasonic transducer measuring channel and an upper bubble breaking channel which are arranged from bottom to top successively and are communicated with each other, the lower bubble breaking channel is communicated with the seep tent provided with bubble breaking grids, a lower bubble breaking device and an upper bubble breaking device which are arranged in the bubble rising direction are respectively mounted in the lower bubble breaking channel and the upper bubble breaking channel, one side of the ultrasonic transducer measuring channel is fixedly connected with an acoustic wave demultiplexer, and the other side is fixedly connected with flat receiving transducers used for receiving transmitting acoustic waves generated by the acoustic wave demultiplexer, and acoustic wave probes also used for receiving the transmitting acoustic waves generated by the acoustic wave demultiplexer are arranged in the ultrasonic transducer measuring channel.

The flow measuring channel is formed by rings, wherein the rings comprise a first ring for forming the lower bubble breaking channel, a second ring for forming the ultrasonic transducer measuring channel, a third ring for forming the upper bubble breaking channel and a fourth ring fixedly connected with the seep tent, the first ring, the second ring, the third ring and the fourth ring are fixed to one another by a connecting shaft, and the acoustic wave demultiplexer, the flat receiving transducers and the acoustic wave probes are all fixed on the second ring.

The second ring comprises a second ring I and a second ring II, and a bubble isolating plate is arranged between the second ring I and the second ring II.

A sleeve used for protecting the connecting shaft is sleeved outside the connecting shaft.

The upper end of the connecting shaft is fixedly connected with a reinforcing cross rod.

The acoustic wave demultiplexer comprises an acoustic wave demultiplexer body, a fixed seat acoustic transmission section, a flat acoustic wave transmitting transducer, a fixed seat and a sealing joint, wherein the acoustic wave demultiplexer body comprises an end and two acoustic wave branching mechanisms integrally formed with one side of the end, the structures of the at least two acoustic wave branching mechanisms are identical, a first acoustic wave reflecting plate is arranged on each acoustic wave branching mechanism, and a second acoustic wave reflecting plate is arranged between the two acoustic wave branching mechanisms, two ends of the fixed seat acoustic transmission section are fixedly connected with the other side of the end and one side of the fixed seat respectively, the flat acoustic wave transmitting transducer is arranged on the end the of the fixed seat acoustic transmission section and located within a sealed cavity formed in the fixed seat, the sealing joint is fixedly connected to the other side of the fixed seat, and a driving cable connected with the flat acoustic wave transmitting transducer is connected with an external signal source through the sealing joint.

The two acoustic wave branching mechanisms are respectively fixed on the second ring I and the second ring II, the number of the flat receiving transducers is two, the two flat receiving transducers are respectively sealed in a first flat receiving transducer fixing seat fixed to the second ring I and a second flat receiving transducer fixing seat fixed to the second ring II, and the two flat receiving transducers correspond to the two acoustic wave branching mechanisms.

The number of the acoustic wave probes is four, and the four acoustic wave probes are arranged in pair and respectively fixed on the second ring I and the second ring II through acoustic wave probe fixing seats.

The lower bubble breaking device comprises a support assembly, a power transmission and bubble breaking assembly and a cellular core plate, wherein the support assembly comprises a lower support, a supporting plate, a cellular core plate mounting plate and an upper support which are arranged from bottom to top successively, the power transmission and bubble breaking, assembly comprises a supporting ring, an impeller shaft, an impeller and a bubble cutter, the cellular core plate is mounted in the cellular core plate mounting plate, the supporting plate is fixed on the outer side of the supporting ring, the impeller shaft inns through the supporting ring; the impeller fixedly connected with the lower end of the impeller shaft is located within a lower center perforation formed in the lower support, the bubble cutter fixedly connected with the upper end of the impeller shaft is located within an upper center perforation formed in the upper support, both the impeller and the bubble cutter are coaxial with the impeller shaft, and an upper stop block and a lower stop block fixed on the impeller shaft are respectively arranged on the upper side and the lower side of the supporting ring, and both the upper stop block and the lower stop block are coaxial with the impeller shaft.

The upper bubble breaking device comprises at least two bubble baffles and bubble partitions, the at least two bubble baffles are arranged from bottom to top successively in the bubble rising direction, each bubble baffle is provided with circular holes used for segmenting rising bubbles, and the circular holes of each bubble baffle have an equal radius, the circular holes in the height direction of the uniform breaking device are progressively increased in number and progressively reduced in radius, and each bubble partition used for preventing the segmented rising bubbles from being combined again is arranged between two adjacent bubble baffles.

The bubble breaking grids are mainly used for preventing seafloor sediments or organisms from blocking the instrument, the top of the seep tent is connected with the flow measuring channel through the fourth ring, the flow measuring channel consists of the upper and lower bubble breaking channels and the ultrasonic transducer measuring channel which are serially connected and fixed to each other by the connecting shaft and the reinforcing cross rod, the lower bubble breaking channel is used for segmenting the rising bubbles into bubbles distributed uniformly in the channel and having equal radius so as to obtain good acoustic wave signal characteristics, and the upper bubble breaking channel is used for preventing the bubbles distributed uniformly from gathering together to form bubbles which are not distributed uniformly and do not have equal radius. The ultrasonic transducer measuring channel interconnects one acoustic wave demultiplexer, four acoustic wave probes and two flat receiving transducers through the second ring and the acoustic wave probe fixing seats, the acoustic wave demultiplexer is used for dividing the transmitting acoustic waves transmitted by the acoustic wave transmitting transducer into two paths of homologous acoustic waves, and the acoustic wave probes and the flat receiving transducers are used for receiving acoustic wave signals penetrating through bubbles disturbed uniformly.

A flow measuring channel mounting base is mounted below the flow measuring channel, to facilitate the connection with the seep tent.

The flow measuring channel is provided with four acoustic wave probes, two flat receiving transducers and one acoustic wave demultiplexer, the acoustic wave demultiplexer transmits an upper beam and a lower beam of acoustic waves, the two acoustic wave probes and the one flat receiving transducer constitute a group of sensors, which are mounted in the same cross section of the flow measuring channel, are located in the same plane as the upper wave beam transmitted by the acoustic wave demultiplexer and receive this beam of acoustic waves. The remaining two acoustic wave probes and one flat receiving transducer are mounted in the other cross section of the flow measuring channel, are located in the same plane as the lower wave beam transmitted by the acoustic wave demultiplexer, and constitute the other group of sensors to receive the lower beam of acoustic waves.

The bubble flow rate and the sectional gas content are obtained by processing the acoustic wave signals, and the total flow value of natural gas can be obtained in combination with the recorded time.

In-situ measuring natural gas flux at the hydrocarbon seeps at the seafloor is determined by the established bubble rising velocity and average bubble density and the relation between the amplitude of the acoustic waves and the phase. The seafloor cold natural gas bubbles seeping upwards enter the flow measuring channel through the seep tent after the rising bubbles penetrate through the lower bubble breaking channel, small bubbles having equal radius and distributed uniformly are formed in the channel and then enter the ultrasonic transducer measuring channel, the acoustic wave transmitting transducer transmits continuous acoustic wave signals with certain frequency, and two paths of acoustic waves with the same spectrum characteristics and energy are formed through the acoustic wave demultiplexer, and the two paths of acoustic waves with the same energy penetrate through the bubbles distributed uniformly in the ultrasonic transducer measuring channel, and then are received by the acoustic wave probes and the flat receiving transducers, to obtain the bubble flow rate and the sectional gas content. After the bubbles penetrating through the ultrasonic transducer measuring channel enter the upper bubble breaking channel, the bubbles subsequently gather together and enter seawater. The total flow value of natural gas can be obtained through the obtained bubble flow rate and sectional gas content and the recorded time.

The present invention has the beneficial effects that the shortcoming that the existing on-line measuring device for in-situ seepage flow of seafloor cold natural gas can not carry out long-term in-situ and on-line observation is overcomed, and the system of the invention can adapt to the environments of different water depths and can be used for carrying out long-term in-situ and on-line measuring natural gas flux at the hydrocarbon seeps at the seafloor under different water depths.

Reference numbers: 1, flux measuring channel; 11, lower bubble breaking channel; 12, ultrasonic transducer measuring channel; 13, upper bubble breaking channel; 2, seep tent; 3, bubble breaking grid; 4, lower bubble breaking device; 41, lower support; 42, impeller shaft; 43, impeller; 44, bubble cutter; 45, upper stop block; 46, lower stop block; 47, cellular core plate mounting plate; 48, upper support; 49, cellular core plate; 410, supporting plate; 411, supporting ring; 5, upper bubble breaking device; 51, bubble baffle; 511, circular hole; 52, bubble partition; 6, ring; 61, first ring; 62, second ring; 621, second ring I; 622, second ring II; 63, third ring, 64, fourth ring; 65, connecting shaft; 66, bubble isolating plate; 67, sleeve; 68, reinforcing cross rod; 69, measuring channel mounting base; 7, acoustic wave demultiplexer; 71, acoustic wave demultiplexer body; 72, acoustic wave reflecting plate; 73, supporting rod; 74, acoustic wave reflecting plate; 75, locking screw; 76, acoustic wave branching unit sizing block; 77, fixed seat acoustic transmission section; 78, flat acoustic wave transmitting transducer; 79, fixed seat middle section; 710, sealing end; 711, sealing joint; 8, flat receiving transducer; 81, first flat receiving transducer fixing seat; 82, second flat receiving transducer fixing seat; 9, acoustic wave probe; 91, acoustic wave probe fixing seat.

DETAILED DESCRIPTION OF THE EMBODIMENTS

The contents of the present invention will be further described in detail below in combination with the accompanying drawings and the specific embodiments.

Embodiment

Figure 1:
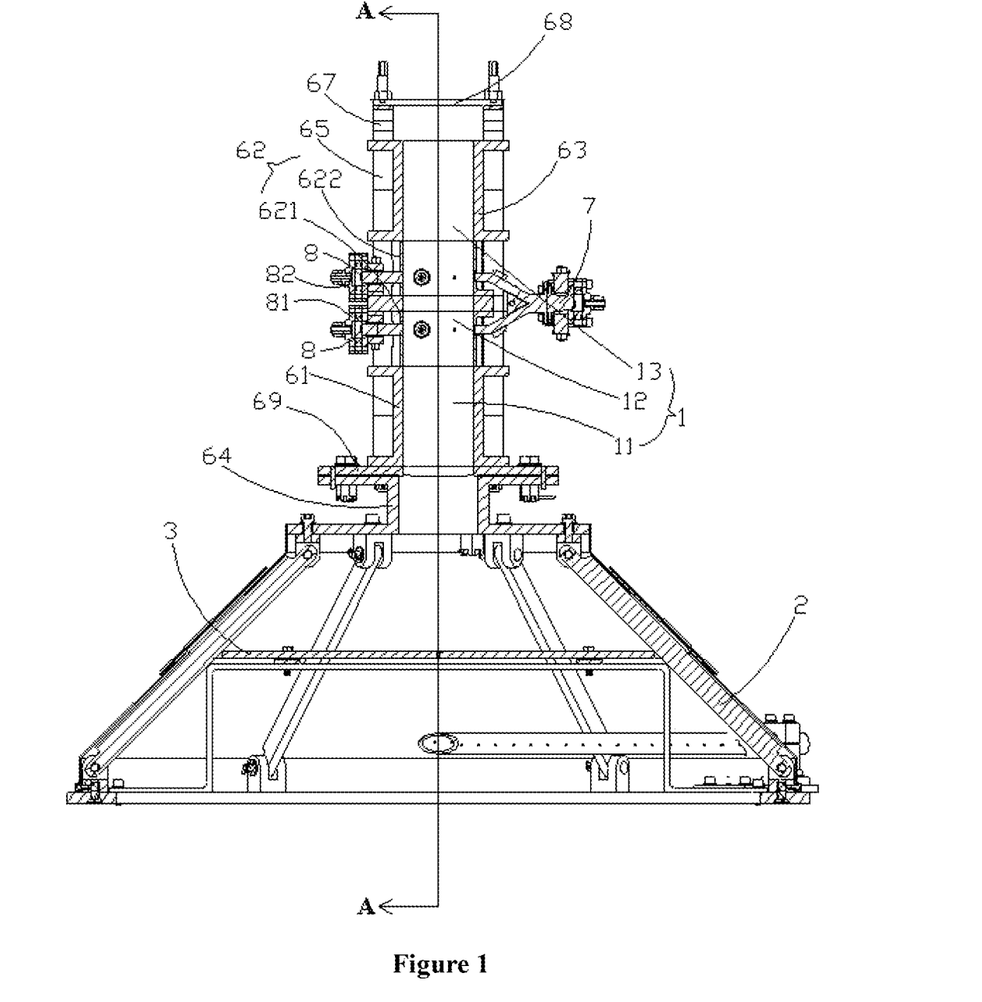
FIG. 1 is a section structure view of an in-situ acoustic measuring system for natural gas flax at the hydrocarbon seeps at the seafloor.
Figure 2:
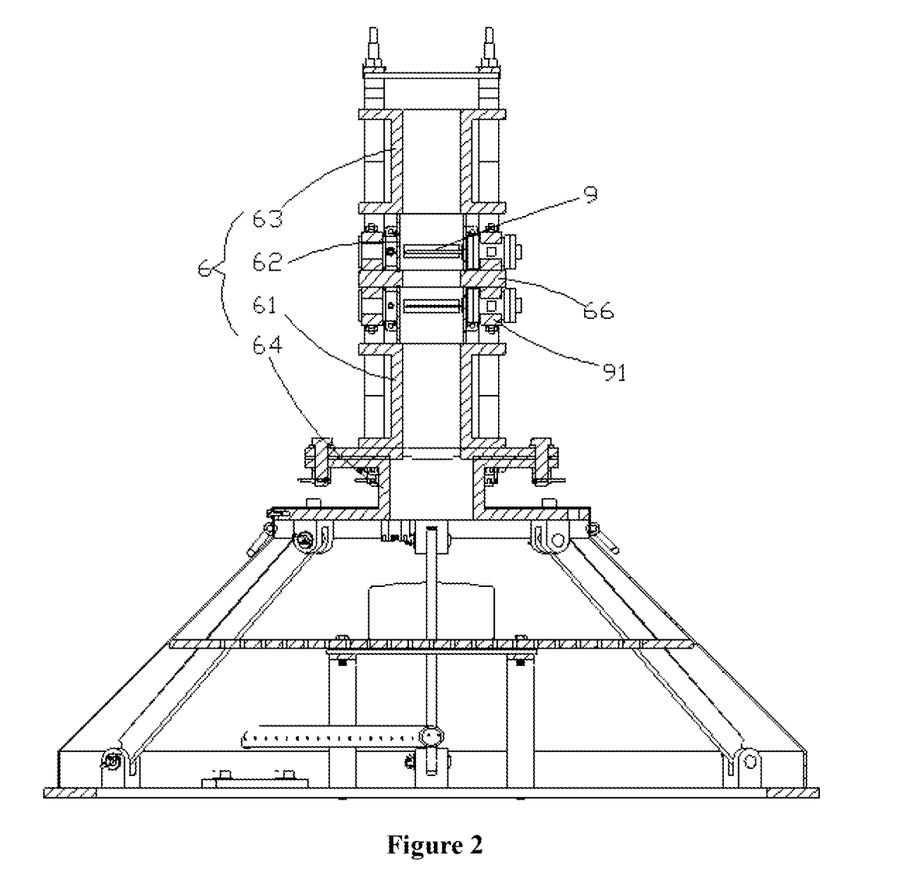
FIG. 2 is a section view of A-A direction in FIG. 1.

As shown in FIGS. 1 and 2, an in-situ acoustic measuring, system for natural gas flux at the hydrocarbon seeps at the seat low comprises a seep tent 2 and a flux measuring channel 1, the flux measuring channel 1 comprising a lower bubble breaking channel 11, an ultrasonic transducer measuring channel 12 and an upper bubble breaking channel 13 which are arranged from bottom to top successively and are communicated with each other, wherein the lower bubble breaking channel 11 is communicated with the seep tent 2 provided with bubble breaking grids 3, a lower bubble breaking device 4 and an upper bubble breaking device 5 which are arranged in the bubble rising direction are respectively mounted in the lower bubble breaking channel 11 and the upper bubble breaking channel 13, one side of the ultrasonic transducer measuring channel 12 is fixedly connected with an acoustic wave demultiplexer 7, and the other side is fixedly connected with flat receiving transducers 8 used for receiving transmitting acoustic waves generated by the acoustic wave demultiplexer 7, and acoustic wave probes 9 also used for receiving the transmitting acoustic waves generated by the acoustic wave demultiplexer 7 are arranged in the ultrasonic transducer measuring channel 12.

The flow measuring channel 1 is formed by rings 6, wherein the rings 6 comprise a first ring 61 for forming the lower bubble breaking channel 11, a second ring 62 for forming the ultrasonic transducer measuring channel 12, a third ring 63 for forming the upper bubble breaking channel 13 and a fourth ring 64 fixedly connected with the seep tent 2, the first ring 61, the second ring 62, the third ring 63 and the fourth ring 64 are fixed to one another by a connecting shaft 65, a sleeve 67 used for protecting the connecting shaft 65 is sleeved outside the connecting shaft 65, an upper end of the connecting shaft 65 is fixedly connected with a reinforcing cross rod 68. The acoustic wave branching unit 7, the flat receiving transducers 8 and the acoustic wave probes 9 are all fixed on the second ring 62. For convenient installation, a measuring channel mounting base 69 is shimmed between the fourth ring 64 and the first ring 61, and the fourth ring 64 and the first ring 61 are locked to each other by a fixing bolt. The second ring 62 comprises a second ring I 621 and a second ring II 622, and a bubble isolating plate 66 is arranged between the second ring I 621 and a second ring II 622.

Figure 5:
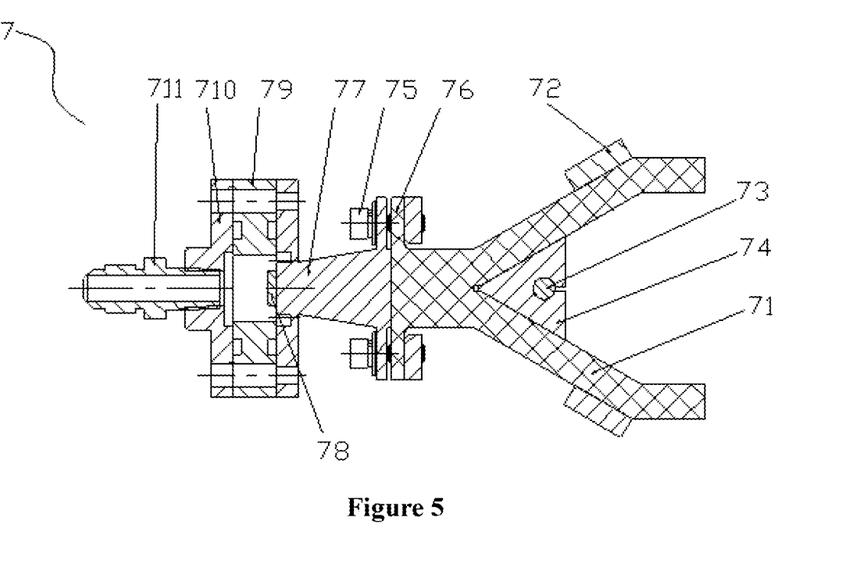
FIG. 5 is a structural schematic diagram of an acoustic wave demultiplexer.

As shown in FIG. 5, the acoustic wave demultiplexer 7 comprises an acoustic wave branching unit body 71, a fixed seat acoustic transmission section 77, a flat acoustic wave transmitting transducer 78, a fixed seat and a sealing joint 711, wherein the acoustic wave branching unit body 71 comprises an end and two acoustic wave branching mechanisms integrally formed with one side of the end, the structures of the two acoustic wave branching mechanisms are identical, an acoustic wave reflecting plate 72 is arranged on each acoustic wave branching mechanism, and an acoustic wave reflecting plate 74 is arranged between the two acoustic wave branching mechanisms, the acoustic wave reflecting plate 74 is fixed by a supporting rod 73, and the acoustic wave reflecting plate 72 is square, and the acoustic wave reflecting plate 74 is conical. Two ends of the fixed seat acoustic transmission section 77 are fixedly connected with the other side of the end and one side of the fixed seat respectively, the flat acoustic wave transmitting transducer 78 is arranged on the end face of the fixed seat acoustic transmission section 77 and located within a sealed cavity formed in the fixed seat, and the sealed cavity is filled with an acoustic material layer. The sealing joint 711 is fixedly connected to the other side of the fixed seat, and a driving cable connected with the flat acoustic wave transmitting transducer 78 is connected with an external signal source through the sealing joint 711. The fixed seat acoustic transmission section 77 is fixedly connected with the end by matched structures of locking screws 75 and acoustic wave branching unit sizing blocks 76. The fixed seat comprises a fixed seat middle section 79 and a sealing end 710, a connecting plate matched with the fixed seat middle section 79 in shape is arranged at one end, away from the acoustic wave branching unit body 71, of the fixed seat acoustic transmission section 77, the sealing end 710 and the connecting plate are respectively fixedly connected to two sides of the fixed seat middle section 79, one end of the sealing joint 711 is fixed on the sealing end 710, the sealed cavity is formed at the fixed seat middle section 79 or between the fixed seat middle section 79 and the sealing end 710, and the driving cable penetrating through the sealing joint 711 is connected with the flat acoustic wave transmitting transducer 78 through the sealing end 710. An annular gasket is arranged between the fixed seat middle section 79 and the sealing end 710 and between the fixed seat middle section 79 and the connecting plate.

Natural gas bubbles seeping upwards from hydrocarbon seeps pass through the flow measuring channel, the rising bubbles form small bubbles having equal radius and distributed uniformly in the flow measuring channel, then the small bubbles enter the ultrasonic transducer measuring channel, an external signal source is electrically connected with the flat acoustic wave transmitting transducer by the driving cable so that the acoustic wave transmitting transducer transmits continuous acoustic wave signals with certain frequency, at least two paths of acoustic waves with the same spectrum characteristics and energy are formed through the acoustic wave demultiplexer body, and the acoustic waves with the same characteristics penetrate through the bubbles distributed uniformly in the measuring channel to form at least two paths of transmitting acoustic waves, which are received by the external transducers for measuring the floating velocity of seepage bubbles of seafloor cold natural gas.

The two acoustic wave branching mechanisms are respectively fixed on the second ring I 621 and the second ring II 622, the number of the flat receiving transducers 8 is two, the two flat receiving transducers 8 are respectively sealed in a first flat receiving transducer fixing seat 81 fixed to the second ring I 621 and a second flat receiving transducer fixing seat 82 fixed to the second ring II 622, and the two flat receiving transducers 8 correspond to the two acoustic wave branching mechanisms. The number of the acoustic wave probes 9 is four, and the four acoustic wave probes 9 are arranged in pair and respectively fixed on the second ring I 621 and the second ring II 622 through acoustic wave probe fixing seats 91.

Figure 3:
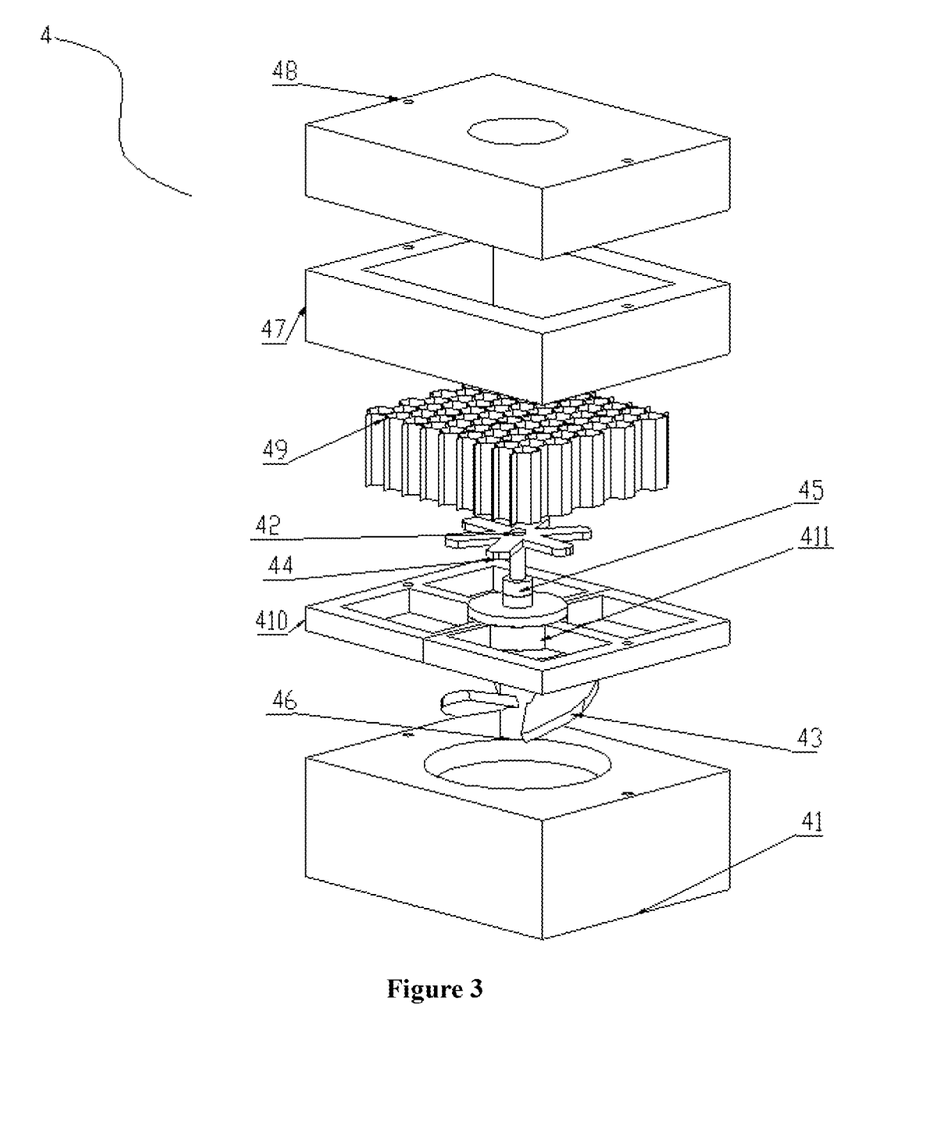
FIG. 3 is a structural schematic diagram of a lower bubble breaking device.

As shown in FIG. 3, the lower bubble breaking device 4 comprises a support assembly, a power transmission and bubble breaking assembly, a bubble diversion part and the like. The support assembly comprises a lower support 41, a supporting plate 410, a cellular core plate mounting plate 47 and an upper support 48 which are stacked in sequence; the power transmission and bubble breaking assembly comprises an impeller shaft 42, an impeller 43, a bubble cutter 44, an upper stop block 45, a lower stop block 46, a supporting ring 411 and the like; the bubble diversion part consists of a cellular core plate 49 and the like. The lower support 41, the supporting plate 410, the cellular core plate mounting plate 47 and the upper support 48 in the support assembly are arranged from bottom to top successively, and are fixed with each other by bonding or screws or other mechanical method, and the cellular core plate 49 is mounted in the cellular core plate mounting plate 47. The power transmission and bubble breaking assembly comprises a power acquisition component, a power transmission component and a bubble breaking component, wherein the power acquisition component is the impeller 43, the power transmission component comprises the impeller shaft 42, the upper stop block 45 and the lower stop block 46; and the bubble breaking component is the bubble cutter 44. The supporting plate 410 is fixed on the outer side of the supporting ring 411, the impeller shaft 42 runs through the supporting ring 411, the impeller 43 fixedly connected with the lower end of the impeller shaft 42 is located within a lower center perforation formed in the lower support 41, and the bubble cutter 44 fixedly connected with the upper end of the impeller shaft 42 is located within an upper center perforation formed in the upper support 48. The cellular core plate 49 is placed close to the bubble cutter 44, core holes of the cellular core plate 49 are equilaterally hexagonal, and the cellular core plate 49 is formed by bonding multiple layers of molded aluminum foils.

The impeller 43 is driven by rising kinetic energy of bubbles to rotate without additional energy. The impeller 43 is coaxially and fixedly connected with the impeller shaft 42, the impeller shaft 42 acquires power required for cutting bubbles through the impeller 43, the impeller shaft 42 is coaxially and fixedly connected with the upper stop block 45 and the lower stop block 46, and the axial force and the radial force borne by the impeller shaft. 42 are transmitted to the support assembly by the upper stop block 45 and the lower stop block 46 through the supporting ring 411. The impeller shaft 42 is coaxially and fixedly connected with the bubble cutter 44, and transmits the power to the bubble cutter 44. The impeller 43 rotates and drives the bubble cutter 11 to rotate around the axis of the impeller shaft 42, and the bubble cutter 44 cuts the slit bubbles formed under the diversion effect of the cellular core plate 49 to form bubbles with smaller diameters, namely achieves the purpose of breaking bubbles.

Figure 4:
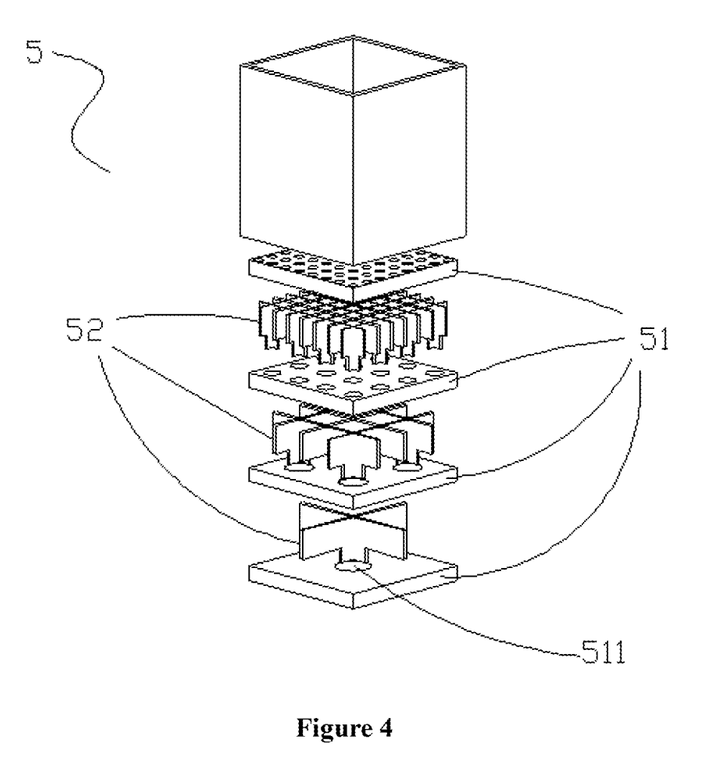
FIG. 4 is a structural schematic diagram of an upper bubble breaking device.

As shown in FIG. 4, the upper bubble breaking device 5 comprises at least two bubble baffles 51 and bubble partitions 52, the at least two bubble baffles 51 are arranged from bottom to top successively in the bubble rising direction, each bubble baffle 51 is provided with circular holes 511 used for segmenting rising bubbles, and the circular holes 511 of each bubble baffle 51 have an equal radius, and the circular holes 511 in the height direction of the uniform breaking device are progressively increased in number and progressively reduced in radius, and each bubble partition 52 used for preventing the segmented rising bubbles from being combined again is arranged between two adjacent bubble baffles 51. The bubble partitions 52 are distributed in a grid shape, the grids are square, the center point of each square corresponds to the center of the circular hole 511 of the bubble baffle 51 thereon, and the intersection of four adjacent grids is located in the center of the circular hole 511 of the bubble baffle 51 below.

The above detailed description is specific description of feasible embodiments of the present invention, and the embodiments are not used for limiting the protection scope of the present invention. All equivalent implementations or changes made without departing from the present invention should be encompassed within the protection scope of the present invention.

The invention claimed is:

1. An in-situ ultrasonic measuring system for natural gas flux at hydrocarbon seeps at a seafloor, comprising a seep tent and a flow measuring channel,
   the flow measuring channel comprising a lower bubble breaking channel, an ultrasonic transducer measuring channel, and an upper bubble breaking channel which are arranged from bottom to top successively and are in communication with each other,
   the lower bubble breaking channel is communicated with the seep tent provided with bubble breaking grids,
   a lower bubble breaking device and an upper bubble breaking device which are arranged in a bubble rising direction are respectively mounted in the lower bubble breaking channel and the upper bubble breaking channel,
   one side of the ultrasonic transducer measuring channel is fixedly connected with an acoustic wave demultiplexer, and another side of the ultrasonic transducer measuring channel is fixedly connected with flat receiving transducers used for receiving transmitting acoustic waves generated by the acoustic wave demultiplexer, and
   acoustic wave probes also used for receiving the transmitting acoustic waves generated by the acoustic wave demultiplexer are arranged in the ultrasonic transducer measuring channel.

2. The in-situ ultrasonic measuring system for natural gas flux at the hydrocarbon seeps at the seafloor of claim 1, wherein the flow measuring channel is formed by rings, the rings comprise a first ring for forming the lower bubble breaking channel, a second ring for forming the ultrasonic transducer measuring channel, a third ring for forming the upper bubble breaking channel and a fourth ring fixedly connected with the seep tent, the first ring, the second ring, the third ring and the fourth ring are fixed to one another by a connecting shaft, and the acoustic wave demultiplexer, the flat receiving transducers and the acoustic wave probes are all fixed on the second ring.

3. The in-situ ultrasonic measuring system for natural gas flux at the hydrocarbon seeps at the seafloor of claim 2, wherein the second ring comprises a second ring I and a second ring II, and a bubble isolating plate is arranged between the second ring I and the second ring II.

4. The in-situ ultrasonic measuring system for natural gas flux at the hydrocarbon seeps at the seafloor of claim 2, wherein a sleeve used for protecting the connecting shaft is sleeved outside the connecting shaft.

5. The in-situ ultrasonic measuring system for natural gas flux at the hydrocarbon seeps at the seafloor of claim 4, wherein the upper end of the connecting shaft is fixedly connected with a reinforcing cross rod.

6. The in-situ ultrasonic measuring system for natural gas flux at the hydrocarbon seeps at the seafloor of claim 3, wherein the acoustic wave demultiplexer comprises an acoustic wave demultiplexer body, a fixed seat acoustic transmission section, a flat acoustic wave transmitting transducer, a fixed seat and a sealing joint, the acoustic wave demultiplexer body comprises an end and two acoustic wave branching mechanisms integrally formed with one side of the end, the structures of the at least two acoustic wave branching mechanisms are identical, a first acoustic wave reflecting plate is arranged on each acoustic wave branching mechanism, a second acoustic wave reflecting plate is arranged between the two acoustic wave branching mechanisms, two ends of the fixed seat acoustic transmission section are fixedly connected with the other side of the end and one side of the fixed seat respectively, the flat acoustic wave transmitting transducer is arranged on the end face of the fixed seat acoustic transmission section and located within a sealed cavity formed in the fixed seat, the sealing joint is fixedly connected to the other side of the fixed seat, and a driving cable connected with the flat acoustic wave transmitting transducer is connected with an external signal source through the sealing joint.

7. The in-situ ultrasonic measuring system for natural gas flux at the hydrocarbon seeps at the seafloor of claim 6, wherein the two acoustic wave branching mechanisms are respectively fixed on the second ring I and the second ring II, the number of the flat receiving transducers is two, the two flat receiving transducers are respectively sealed in a first flat receiving transducer fixing seat fixed to the second ring I and a second flat receiving transducer fixing seat fixed to the second ring II, and the two flat receiving transducers correspond to the two acoustic wave branching mechanisms.

8. The in-situ ultrasonic measuring system for natural gas flux at the hydrocarbon seeps at the seafloor of claim 3, wherein the number of the acoustic wave probes is four, and the four acoustic wave probes are arranged in pairs and respectively fixed on the second ring I and the second ring II through acoustic wave probe fixing seats.

9. The in-situ ultrasonic measuring system for natural gas flux at the hydrocarbon seeps at the seafloor of claim 1, wherein the lower bubble breaking device comprises a support assembly, a power transmission and bubble breaking assembly and a cellular core plate, the support assembly comprises a lower support, a supporting plate, a cellular core plate mounting plate and an upper support which are arranged from bottom to top successively, the power transmission and bubble breaking assembly comprises a supporting ring, an impeller shaft, an impeller and a bubble cutter, the cellular core plate is mounted in the cellular core plate mounting plate, the supporting plate is fixed on the outer side of the supporting ring, the impeller shaft runs through the supporting ring, the impeller fixedly connected with the lower end of the impeller shaft is located within a lower center perforation formed in the lower support, the bubble cutter fixedly connected with the upper end of the impeller shaft is located within an upper center perforation formed in the upper support, both the impeller and the bubble cutter are coaxial with the impeller shaft, an upper stop block and a lower stop block fixed on the impeller shaft are respectively arranged on the upper side and the lower side of the supporting ring, and both the upper stop block and the lower stop block are coaxial with the impeller shaft.

10. The in-situ ultrasonic measuring system for natural gas flux at the hydrocarbon seeps at the seafloor of claim 1, wherein the upper bubble breaking device comprises at least two bubble baffles and bubble partitions, the at least two bubble baffles are arranged from bottom to top successively in the bubble rising direction, each bubble baffle is provided with circular holes used for segmenting rising bubbles, the circular holes of each bubble baffle have an equal radius, the circular holes in the height direction of the uniform breaking device are progressively increased in number and progressively reduced in radius, and each bubble partition used for preventing the segmented rising bubbles from being combined again is arranged between two adjacent bubble baffles.

11. The in-situ ultrasonic measuring system for natural gas flux at the hydrocarbon seeps at the seafloor of claim 3, wherein a sleeve used for protecting the connecting shaft is sleeved outside the connecting shaft.

* * * * *